US009701061B1

(12) United States Patent
Roach et al.

(10) Patent No.: US 9,701,061 B1
(45) Date of Patent: Jul. 11, 2017

(54) TENDON PLACEMENT FOR HIGH-ALTITUDE BALLOONS

(71) Applicant: X Development LLC, Mountain View, CA (US)

(72) Inventors: Kevin Roach, Boulder Creek, CA (US); Jeffrey Neri, Gardnerville, NV (US)

(73) Assignee: X Development LLC, Mountain View, CA (US)

( * ) Notice: Subject to any disclaimer, the term of this patent is extended or adjusted under 35 U.S.C. 154(b) by 352 days.

(21) Appl. No.: 14/449,518

(22) Filed: Aug. 1, 2014

Related U.S. Application Data

(60) Provisional application No. 61/918,772, filed on Dec. 20, 2013.

(51) Int. Cl.
*B29C 65/78* (2006.01)
*B29C 65/00* (2006.01)
(Continued)

(52) U.S. Cl.
CPC ...... *B29C 65/7802* (2013.01); *B29C 65/4825* (2013.01); *B29C 65/50* (2013.01);
(Continued)

(58) Field of Classification Search
CPC ..... B29C 65/7802; B29C 66/18; B29C 66/43; B29C 66/474; B29C 66/80; B29C 66/814; B29L 2022/022
See application file for complete search history.

(56) References Cited

U.S. PATENT DOCUMENTS 2,635,671 A   4/1953   La Mere et al.
2,656,293 A   10/1953  Huch
(Continued)

FOREIGN PATENT DOCUMENTS

CN   1241515 A    1/2000
CN   102178996 A  9/2011
JP   09-056934    3/1997

OTHER PUBLICATIONS

P. G. Scott et al. "Long Duration Balloon Technology Survey." Final Report: Report No. WII-9942-01-TR-01. Wizen International, Inc. Mar. 11, 1989, 66 pages. Retrieved from: <http://www.dtic.mil/dtic/tr/fulltext/u2/a206975.pdf>.

(Continued)

*Primary Examiner* — Mark A Osele
*Assistant Examiner* — Christopher C Caillouet
(74) *Attorney, Agent, or Firm* — Lerner, David, Littenberg, Krumholz & Mentlik, LLP

(57) ABSTRACT

Aspects of the disclosure relate to manufacturing balloon envelopes for use in high-altitude mesh networks for packet-data communications. As an example, a gore portion may be placed on a table such that the gore portion overlies a groove within the table. A tendon may be placed on the gore portion and within the groove. A portion of tubing may be placed over the tendon. The tubing may have one or more surface openings. Restraining tape is applied over the one or more surface openings in the tubing. A constant force roller is applied to secure the tendon to the gore portion and to secure the tendon to the tubing. As an alternative or in addition to the surface openings, double-sided restraining tape may be placed between the tendon and the tubing. The tubing and restraining tape may prevent undesired lateral and longitudinal movement of the tendon during deployment.

20 Claims, 12 Drawing Sheets

(51) Int. Cl.
  *B29C 65/18* (2006.01)
  *B29C 65/50* (2006.01)
  *B29C 65/48* (2006.01)
  *B29L 22/02* (2006.01)

(52) U.S. Cl.
  CPC ........ *B29C 66/474* (2013.01); *B29K 2623/06* (2013.01); *B29L 2022/022* (2013.01)

(56) References Cited

U.S. PATENT DOCUMENTS

| | | | |
|---|---|---|---|
| 2,666,600 | A | 1/1954 | Huch et al. |
| 2,679,224 | A | 5/1954 | Sturtevant |
| 2,703,769 | A | 3/1955 | Stinger et al. |
| 2,767,941 | A | 10/1956 | Gegner et al. |
| 2,790,479 | A | 4/1957 | Mastenbrook |
| 3,047,252 | A | 7/1962 | Huch et al. |
| 3,149,017 | A | 9/1964 | Ehrreich et al. |
| 3,269,884 | A | 8/1966 | Slater |
| 3,369,954 | A | 2/1968 | Fener |
| 3,558,083 | A | 1/1971 | Conley et al. |
| 4,662,134 | A | 5/1987 | Illgner |
| 4,713,047 | A | 12/1987 | Klinkel |
| 4,795,520 | A | 1/1989 | Klabius et al. |
| 4,877,205 | A | 10/1989 | Rand |
| 4,911,380 | A | 3/1990 | Regipa |
| 5,061,331 | A | 10/1991 | Gute |
| 9,027,874 | B1 | 5/2015 | Roach et al. |
| 9,027,877 | B1 | 5/2015 | Brookes |
| 9,174,719 | B1 | 11/2015 | Roach et al. |
| 9,221,531 | B1 | 12/2015 | Brookes |
| 9,242,712 | B1 | 1/2016 | Ratner |
| 2009/0002257 | A1 | 1/2009 | de Jong et al. |
| 2011/0083784 | A1 | 4/2011 | Henry et al. |
| 2011/0108612 | A1 | 5/2011 | Nickell et al. |
| 2014/0238600 | A1 | 8/2014 | Mahn |
| 2015/0174817 | A1 | 6/2015 | Roach et al. |

OTHER PUBLICATIONS

A. L. Morris. "Scientific Ballooning Handbook." NCAR Technical Note. Atmospheric Technology Division, National Center for Atmospheric Research. May 1975, 258 pages.

Yajima, N. A New Design and Fabrication Approach for Pressurized Balloon. Advances in Space Research. vol. 26, No. 9. © 2000, pp. 1357-1360.

Winker, J. A. Pumpkins and Onions and Balloon Design. Advances in Space Research. vol. 30, No. 5. © 2002, pp. 1199-1204.

Notification of the First Office Action for Chinese Patent Application No. 201480075881.1, dated Feb. 16, 2017.

TENDON PLACEMENT FOR HIGH-ALTITUDE BALLOONS

CROSS-REFERENCE TO RELATED APPLICATIONS

The present application claims the benefit of the filing date of U.S. Provisional Patent Application No. 61/918,772 filed Dec. 20, 2013, the disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly.

Some systems may provide network access to remote locations or to locations with limited networking infrastructure via a balloon network operating in the stratosphere. Because of the various forces experienced by these balloons during deployment and operation, there is a balancing of needs between flexibility and stability of materials. The balloons may be made of more flexible envelope material configured in sections or lobes to create a "pumpkin"-type or lobed balloon. The lobes may be supported by tendon structures. Typically, the tendons are heat sealed into seams between lobes of the balloons or taped to the outside of the envelope with a pressure sensitive adhesive (PSA) tape. When such techniques are performed manually, the efforts become extremely time-consuming and may have low consistency.

SUMMARY

Aspects of the disclosure provide a method for manufacturing a balloon envelope. The method includes placing a gore portion on a table such that the gore portion overlies a groove within the table; placing a tendon on the gore portion and within the groove; placing a portion of tubing over the tendon, the tubing having one or more surface openings; applying restraining tape over the one or more surface openings in the tubing; and applying a constant force roller to secure the tendon to the gore portion and to secure the tendon to the tubing.

In one example, the restraining tape is placed in order to provide stability during inflation of the balloon envelope. In another example, the restraining tape is a pressure sensitive adhesive tape. In another example, the tubing includes a polyethylene thin film having a first edge along which an adhesive is positioned, and the adhesive is configured to secure the tubing to the gore portion when the constant force roller is applied. In another example, the method further includes, prior to applying the constant force roller, placing a second gore portion on the table such that the gore portion overlies the tendon within the groove; placing a second tendon on the second gore portion and within the groove; placing a second portion of tubing over the second tendon, the second tubing having one or more second surface openings; and applying second restraining tape over the one or more second surface openings in the second tubing. In this example, applying the constant force roller further secures the second tendon to the second gore portion and secures the second tendon to the second tubing. In another example, the method also includes before placing the portion of tubing, applying double-sided restraining tape at one or more locations on the tendon and wherein applying the constant force roller further secures the double-sided restraining tape to the tendon and the tubing.

Further aspects of the disclosure provide a method of manufacturing a balloon envelope. The method includes placing a gore portion on a table such that the gore portion overlies a groove within the table; placing a tendon on the gore portion and within the groove; applying double-sided restraining tape at one or more locations on the tendon; placing a portion of tubing over the tendon and the double-sided restraining tape; and applying a constant force roller to secure the tendon to the gore portion and to secure the tendon to the tubing.

In one example, the restraining tape is placed in order to provide stability during inflation of the balloon envelope. In this example, the double-sided restraining tape is a pressure sensitive adhesive tape. In another example, the tubing includes a polyethylene thin film having a first edge along which an adhesive is positioned, and the adhesive is configured to secure the tubing to the gore portion when the constant force roller is applied. In another example, the method also includes, prior to applying the constant force roller, placing a second gore portion on the table such that the gore portion overlies the tendon within the groove; placing a second tendon on the second gore portion and within the groove; applying second double-sided restraining tape at one or more locations on the tendon; and placing a second portion of tubing over the second tendon, the second tubing having one or more second surface openings. In this example, applying the constant force roller further secures the second tendon to the second gore portion and secures the second tendon to the second tubing.

Another aspect of the disclosure provides a method of manufacturing a balloon envelope. The method includes placing a tendon within tubing, cutting an opening in the tubing, placing restraining tape within the opening and around the tending to secure the tendon to the tubing, placing a balloon envelope gore portion on a table such that the gore portion overlies a groove within the table, placing the tubing within the groove and on the gore portion, and securing the tubing to the gore portion.

In one example, the restraining tape is placed in order to provide stability during inflation of the balloon envelope. In another example, the restraining tape is a pressure sensitive adhesive tape. In another example, the tubing includes an adhesive strip and securing the tubing to the gore portion includes placing the adhesive strip on the gore portion and applying pressure to the tubing. In another example, securing the tubing to the gore portion includes heat sealing the tubing to the gore portion. In another example, the method also includes cutting a second opening in the tubing and placing second restraining tape within the second opening and around the tending to secure the tendon to the tubing in order to further secure the tendon within the tubing. In another example, the method also includes applying a tension force to the tendon during placement of the tendon.

DETAILED DESCRIPTION

Overview

Figure 1:
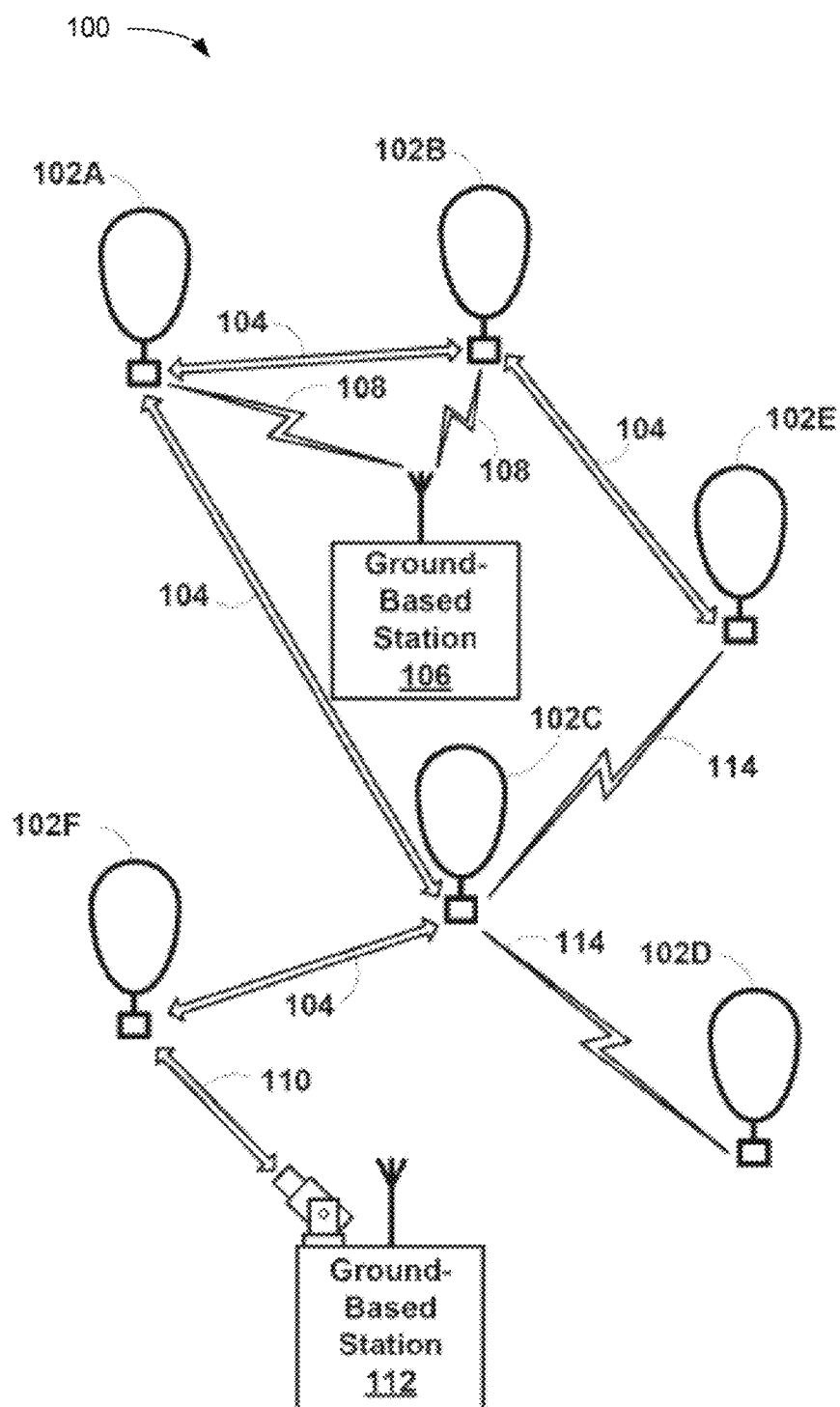
FIG. 1 is a functional diagram of an example system in accordance with aspects of the disclosure.

The technology relates generally to manufacturing balloon envelopes for use with high-altitude balloons for in communications network. For example, in order to optimize the cutting pattern of a high-altitude pumpkin-type or lobed balloon, it is important to balance the deployment (or inflation) stability of the envelope with the strain experienced in the material or film of each of the lobes of an envelope. The lobes may be supported by tendon structures. As the lobe radius of curvature increases, the film strain may decrease, but so does the ability of the balloon to cleanly inflate with proper tendon placement. In other words, the tendons may move laterally and in some cases longitudinally during inflation. This, in turn, may cause problems with a balloon's stability while in the stratosphere.

Various techniques may be implemented to secure the tendon to or between the lobes to prevent lateral movement. As an example, the tendons may be secured to the lobes within tube structures. The tendons may then be fed through the tube structures by hand during the manufacturing process. However, during inflation, if the tendons are secured only at the top and bottom of the envelope, there may be some longitudinal movement of the lobes relative to the tendon. In other words, the tendon may be able to move within the tubing.

Alternatively, a person could lay the tendon onto the film and then apply restraining tape, such as PSA tape, patches to the envelope to ensure that the tendon stays in place until the balloon and its payload reach the float stage of deployment. Both of these methods are increasingly costly and time consuming as they increase the number of attachment points required, and may increase the possibility of damage to the balloon during assembly.

The tubing may be configured as a piece of polyethylene or other thin film that has two strips of adhesive running down the edges. In some examples, the tubing may include a plurality of openings or slits over which restraining tape, such as PSA tape, may be placed to keep the tendon in place longitudinally. If there are no slits, the restraining tape may be laid down on the tendon before the tubing is positioned may be double-sided such that it sticks to both the tendon and an interior surface of the tubing. Alternatively, the tubing may be adhesive across its full breadth to add some dimensional stability to the tendon. Each of these approaches reduces or eliminates longitudinal slip of the tendon within the tubing and also keeps the balloon from sliding down the tendon and bunching.

In order to increase the automation of the manufacturing process, an overhead gantry structure may be used to lay the tendon along the lobes and/or to laydown tape or other adhesive. In addition, the tendon may be tensioned from both sides of the table using clamps or other structures. This may allow a person or another machine could apply pieces of restraining tape. By doing so, the manufacturing process may benefit from the tendon having some play before applying the additional structures that will hold the tendon in place, such as the tubing discussed above, during inflation. In addition, because the tendon is placed before the tubing, an infinite number of attachment points may be used to keep from creating stress concentrations during inflation of the balloon when the tendon may slip partway from a preferred placement.

Once the tape and tubing are positioned on the lobe of an envelope, a force may then be applied to the outside of the tubing. As an example, a constant force roller may be rolled over the tendon laterally or longitudinally. However, the tendon has some thickness, and the roller may work best when the tubing is laid flat. Thus, the lobe may be placed onto a table structure having a groove configured to receive the tendon such that the outer surface of the tendon is approximately flush with the rest of the table structure. This may allow for the smooth application of the tubing and restraining tape. In addition, the groove may be configured to receive multiple tendons.

Example Systems

FIG. 1 depicts an example system 100 in which the balloons described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground-base stations 106 and 112. Balloon network 100 may also include a plurality of additional devices, such as various computing devices (not shown) as discussed in more detail below.

The devices may be configured to communicate with one another. As an example, the balloons may include free-space optical links 104 and/or radiofrequency (RF) links 114 in order to facilitate intra-balloon communications. In this way Balloons 102A-F may collectively function as a mesh network for packet-data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102A-F may be configured to transmit an optical signal via an optical link 104. In addition, a given balloon 102A-F may use one or more high-power light-emitting diodes (LEDs) to transmit an optical signal. Alternatively, some or all of the balloons may include laser systems for free-space optical communications over optical links 104. Other types of free-space optical communication are possible. Further, in order to receive an optical signal from another balloon via an optical link 104, a given balloon may include one or more optical receivers. Additional details of example balloons are discussed in greater detail below, with reference to FIG. 3.

As noted above, one or more balloons may also utilize one or more of various different RF air-interface protocols for communication with ground-based stations via respective RF links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the RF links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon. Like other balloons in network 100, downlink balloon 102F may be operable for optical communication with other balloons via optical links 104. However, downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

In a further aspect, some or all of balloons 102A-F could be configured to establish a communication link with space-based satellites in addition to, or as an alternative to, a ground-based communication link. In some embodiments, a balloon may communicate with a satellite via an optical link. However, other types of satellite communications are possible.

As noted above, balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

The network topology may change as the balloons move relative to one another and/or relative to the ground. Accordingly, balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

The balloon network may be configured as a transparent mesh network, as an opaque mesh network, or both. In a transparent balloon network, the balloons may include components for physical switching that is entirely optical, without any electrical components involved in the physical routing of optical signals. Thus, in a transparent configuration with optical switching, signals travel through a multi-hop lightpath that is entirely optical. In an opaque configuration, some or all of the balloons may use optical-electrical-optical (OEO) switching. For example, some or all balloons may include optical cross-connects (OXCs) for OEO conversion of optical signals.

Balloon network 100 may also implement station-keeping functions to help provide a desired network topology. For example, station-keeping may involve each balloon 102A-F maintaining and/or moving into a certain position relative to one or more other balloons in the network (and possibly in a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Figure 2:
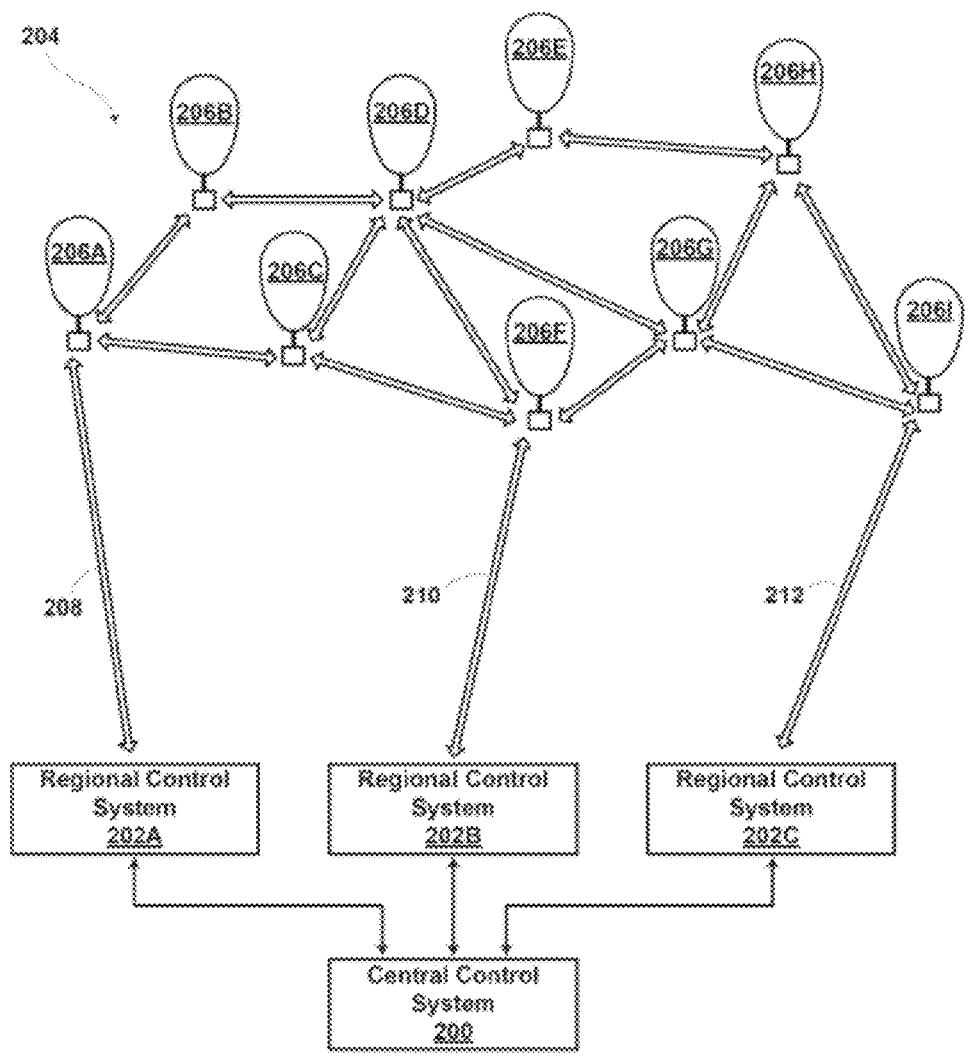
FIG. 2 is another functional diagram of an example system in accordance with aspects of the disclosure.

The mesh networking and/or station-keeping functions may be centralized to control by a designated controller balloon (which aggregates information received from other balloons and sends station-keeping instructions to all other balloons in the balloon network) or by a ground-based station. For example, FIG. 2 depicts a distributed control system, which includes a central control system 200 and a number of regional control-systems 202A and 202B. In this example, regional control systems 202A-C may represent one or more ground-based stations, such as ground-based station 112 of FIG. 1, that is configured to communicate with downlink balloons. Such a control system may be configured to coordinate certain functionality for balloon network 204 (which may be configured the same or similarly to balloon network 100), and as such, may be configured to control and/or coordinate certain functions for balloons 206A-I.

In the example of FIG. 2, central control system 200 may be configured to communicate with balloons 206A-I via a number of regional control systems 202A-C. These regional control systems may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A-C and central control system 200, regional control system 202B may relay communications and/or data between balloons 206D-F and central control system 200, and regional control system 202C may relay communications and/or data between balloons 206G-I and central control system 200.

As with FIG. 1, in order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A-C may respectively communicate with balloons 206A, 206F, and 206I via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A-I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A-I in order to determine an overall state of the network.

Alternatively, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network.

The balloons of balloon networks 100 and/or 200 may be high-altitude balloons, which are deployed in the stratosphere. As an example, in a high-altitude-balloon network, the balloons may generally be configured to operate at altitudes between 18 km and 25 km in order to limit the balloon's exposure to high winds and interference with commercial flights. In order that the balloons can provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 3:
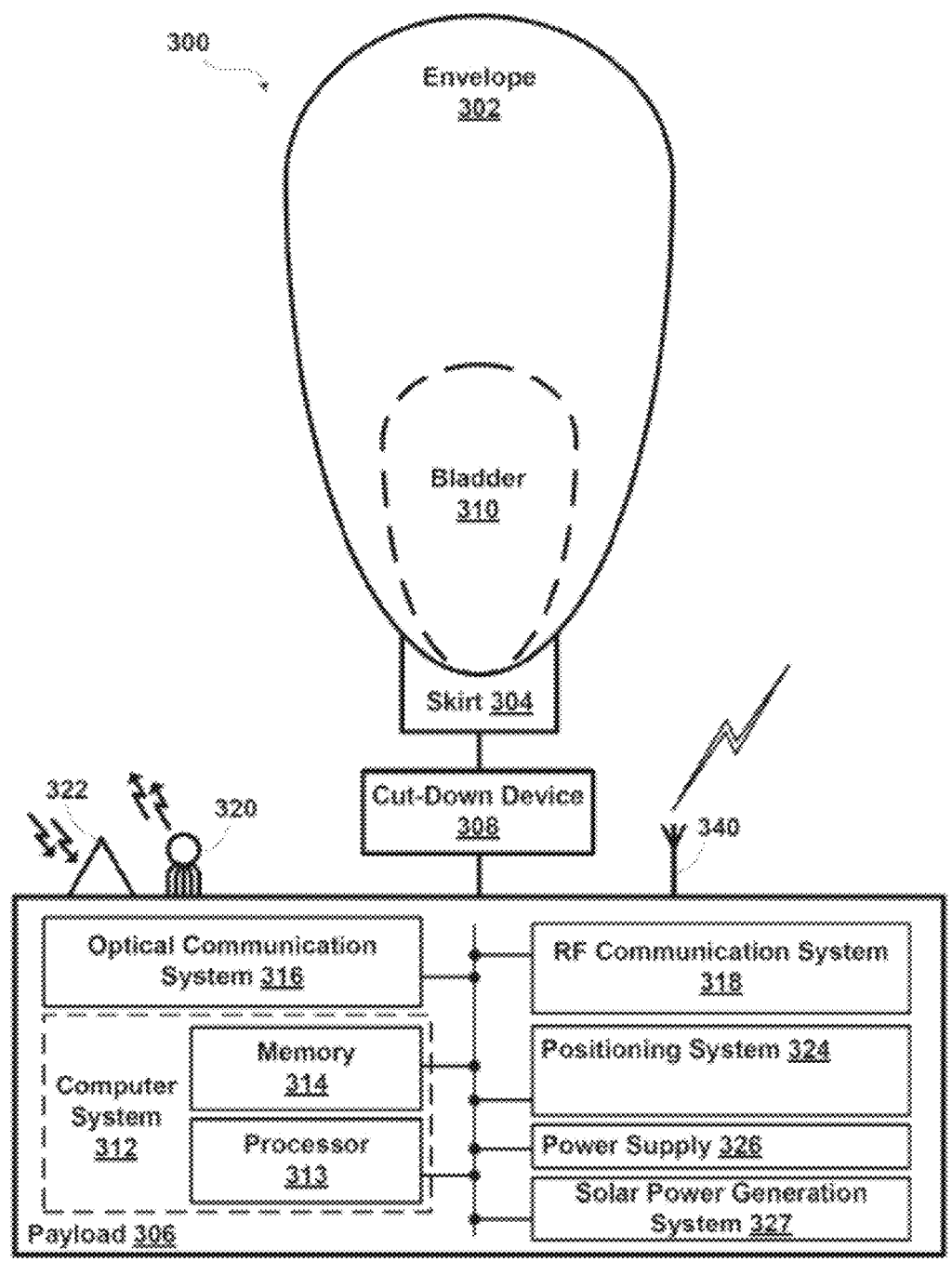
FIG. 3 is an example balloon in accordance with aspects of the disclosure.

In addition to the communication components described above, the high-altitude balloons may include an envelope, and a payload, along with various other components. FIG. 3 is an example high-altitude balloon 300, which may represent any of the balloons of balloon networks 100 or 200. The balloon 300 includes an envelope 302, a skirt 304, and a payload 306.

The envelope 302 and skirt 304 may take various forms, which may be currently well-known or yet to be developed. For instance, the envelope 302 and/or skirt 304 may be made of materials including metalized Mylar or BoPet. Additionally, or alternatively, some or all of the envelope 302 and/or skirt 304 may be constructed from a highly-flexible latex material or rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a computer system 312, which may include a processor 313 and on-board data storage, such as memory 314. Memory 314 of computing device 110 store information accessible by the processor 313, including instructions that can be executed by the processor. Memory also includes data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The data can be retrieved, stored or modified by processor 313 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 313 can include any conventional processors, such as a commercially available CPU. Alternatively, each processor can be a dedicated component such as an ASIC or other hardware-based processor. Although FIG. 1 functionally illustrates the processor, memory, and other elements of computer system 312 as being within the same block, the processor, computer, computing device, or memory can actually comprise multiple processors, computers, computing devices, or memories that may or may not be stored within the same physical housing. For example, the memory can be a hard drive or other storage media located in a housing different from that of computer system 312. Accordingly, references to a processor, computer, computing device, or memory will be understood to include references to a collection of processors, computers, computing devices, or memories that may or may not operate in parallel.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). In this regard, optical communication system 316 and optical-communication receiver 322 may facilitate optical links 104 and/or 110 as shown in FIG. 1. Further, payload 306 may include an RF communication system 318, which may transmit and/or receive RF communications via an antenna system 340. In this regard, RF communication system 318 and antenna system 340 may facilitate RF links 108 and/or 114 as shown in FIG. 1.

The payload 306 may also include a power supply 326 to supply power to the various components of balloon 300. The power supply 326 could include a rechargeable battery. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could also be used to improve balloon stability.

The envelope 302 could be filled with various gasses such as helium, hydrogen or any other lighter-than-air material. The envelope 302 could thus have an associated upward buoyancy force. Thus, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

Alternatively, the envelope 302 could be substantially rigid and include an enclosed volume. Air could be evacuated from envelope 302 while the enclosed volume is substantially maintained. In other words, a least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

A portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Payload 306 may include a navigation system (not shown) separate from, or partially or fully incorporated into computer system 312. The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific may be configured to compute altitudinal adjustments for other balloons and transmit the adjustment commands to those other balloons.

Figure 4:
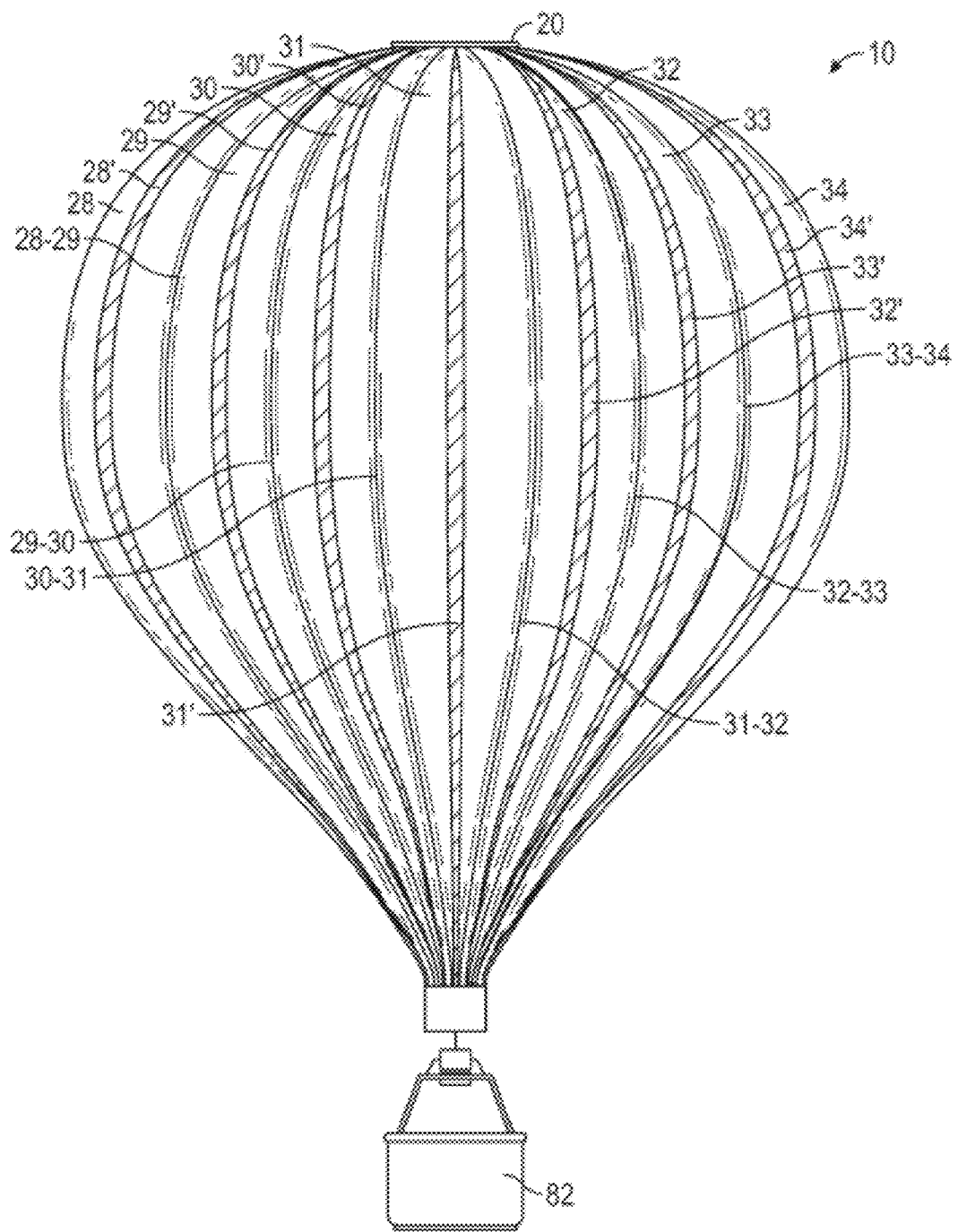
FIG. 4 is another example balloon in accordance with aspects of the disclosure.

FIG. 4 is an example configuration of an envelope 10 of a balloon such as balloon 300. Attached to balloon 10 is payload 82 that may represent payload 306 of FIG. 3. In view of the goal of making the balloon envelope 10 as lightweight as possible, the balloon envelope is comprised of a plurality of envelope lobes or gores comprised of a thin film, such as polyethylene or polyethylene terephthalate, which is lightweight yet has suitable strength properties for use as a balloon envelope.

In this example, balloon envelope 10 is comprised of envelope gore 30 that is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In a preferred embodiment, the envelope gores are comprised of polyethylene having a thickness of 1.5 to 2 mils. Each of the respective envelope gores extend to balloon apex 20.

The individual envelope gores 28-34 may be shaped so that the length of the edge seam connecting adjacent envelope gores is greater than the length of a centerline of the envelope gores. Thus, the envelope gores may be shaped to better optimize the strain rate experienced by the balloon envelope. The pressurized lifting gas within the balloon envelope 10 may cause a force or load to be applied to the balloon envelope. As noted above, tendon structures may be used to provide strength to the balloon envelope and to help withstand the load created by the pressurized gas within the balloon envelope.

The tendons may be placed within tubing. Tube structure 28' is shown positioned on a centerline of envelope gore 28, tube structure 29' is shown positioned on a centerline of envelope gore 29, tube structure 30' is shown positioned on a centerline of envelope gore 30, tube structure 31' is shown positioned on a centerline of envelope gore 31, tube structure 32' is shown positioned on a centerline of envelope gore 32, tube structure 33' is shown positioned on a centerline of envelope gore 33, and tube structure 34' is shown positioned on a centerline of envelope gore 34.

Furthermore, the individual gores 28-34 are shaped so that the length of the edge seam connecting adjacent gores is greater than the length of the centerline of the gores. Therefore, when inflated, there is an excess of envelope material (that includes the edge seams between the adjacent envelope gores) that bulges out somewhat before there is any strain on the envelope material. Therefore, the load is instead applied to the shortest section of the gore—the centerline of the adjacent gores 28-34 where the longitudinal tube structures 28'-34' are applied. Thus, the balloon envelope 10 takes on more of a "pumpkin" shape with the edge seams 28-29, 29-30, 30-31, 31-32, 32-33, and 33-34 of the respective envelope gores bulging outward between the respective tube structures 28'-34'. This design allows for reduced stress and strain on the balloon envelope 10, as the load is designed to be carried primarily by the tube structures 28'-34', rather than the balloon envelope material in envelope gores 28-34.

Figure 5A:
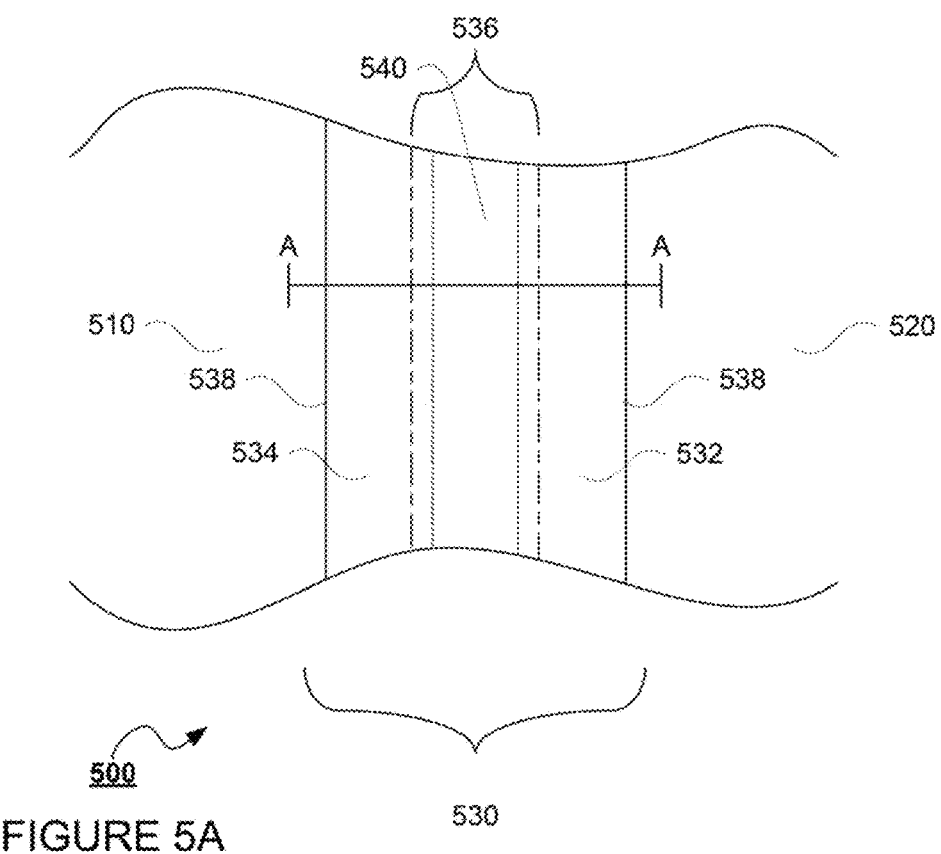
FIGS. 5A and 5B are example diagrams of one or more gores of a balloon including a portion of tubing in accordance with aspects of the disclosure.
Figure 5B:
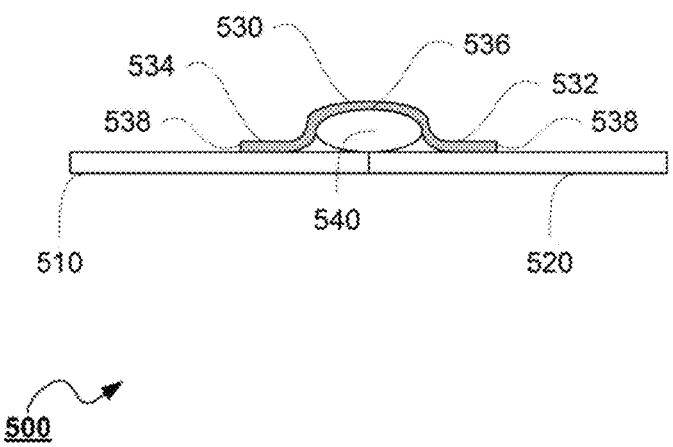

FIGS. 5A and 5B are views of a portion 500 of tubing on one or more gores of a balloon. In particular, FIG. 5A is a side view of a portion of a balloon, such as any of the balloons of FIGS. 1, 2, 3, of 4. FIG. 5B is a cross sectional view through the plane A-A of FIG. 5A. In this example, between envelope gore portions 510 and 520 is a section of tubing 530 (shown as shaded in FIG. 5B). Envelope gore portions 510 and 520 may be part of the same or a different gore. Tubing 530 includes three regions, as discussed in detail below. As noted above, the tubing 530 may be configured as a piece of polyethylene or other thin film.

The tubing 530 may include adhesive surfaces that serve to hold the tubing to the envelope gores. For example, outer regions 532 and 534 include lower surfaces having adhesive strips that hold the tubing to the envelope gore portions 510 and 520. These adhesive strips may run along the outer edges 538 of the outer regions 532 and 534 or the entire width of the regions 532 and 534.

An opening region within the tubing may be configured to receive a tendon. As an example, connecting the outer regions 532 and 534 is an opening region 536. The opening region 536 is disposed between the tubing 530 and the envelope gore portions 510 and 520. In this example, a tendon 540 has been placed within the opening region 536. The adhesive forces of the outer regions 532 and 534 are configured to maintain tendon 540 in place laterally relative to the envelope gore portions 510 and 520. Depending upon the relative sizes of opening region 536 and tendon 540, some small lateral movements may occur. Alternatively, the adhesive surfaces of the tendon may extend from the outer edges 538 of the outer regions and across the opening region 536.

Figure 6A:
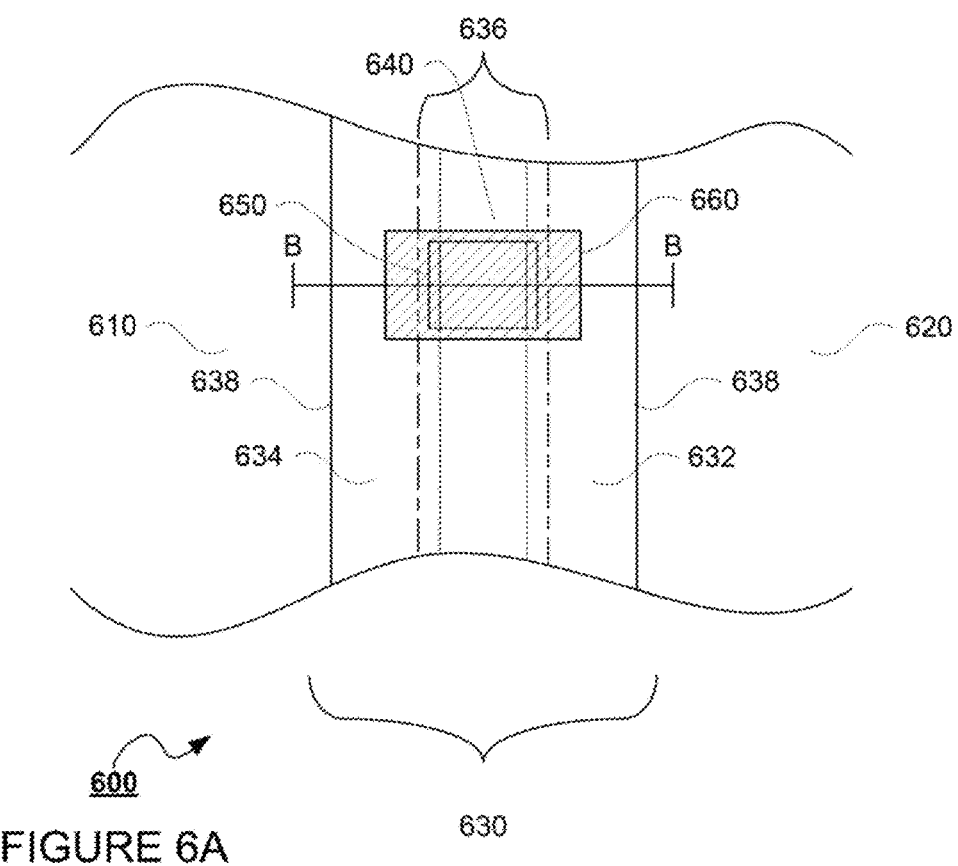
FIGS. 6A and 6B are further example diagrams of one or more gores of a balloon including a portion of tubing in accordance with aspects of the disclosure.
Figure 6B:
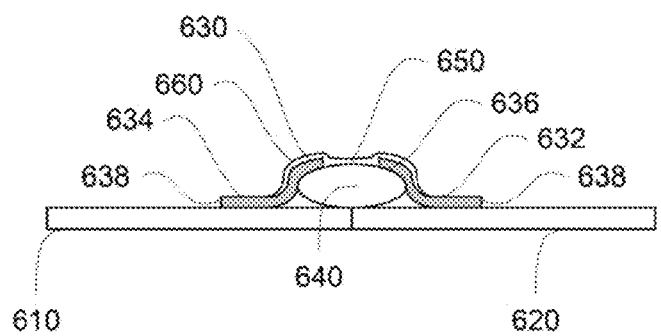

To further secure the tendons within the tubing, the tubing may be configured with a plurality of surface openings over which restraining tape may be placed. FIGS. 6A and 6B are views of a portion 600 of tubing between two gores. FIG. 6B is a cross sectional view through plane B-B of FIG. 6A. As with portion 500, portion 600 includes envelope gore portions 610 and 620, a section of tubing 630 (shown as shaded in FIG. 6B), and a tendon 640. Again, envelope gore portions 610 and 620 may be part of the same or a different gore. Tubing 630 also includes three regions: outer regions 632 and 634 (corresponding to outer regions 532 and 534) having outer edges 638 and an opening region 636. The outer regions 632 and 634 may again include lower surfaces having adhesive strips that hold the tubing to the envelope gore portions 610 and 620. In this example, tubing 640 includes a surface opening 650. Over surface opening is a piece of restraining tape 660 which may function to hold the tendon in place longitudinally (as well as laterally) relative to the tubing 630 and/or envelope gore portions 610 and 620. The restraining tape may include PSA tape.

The surface openings may be placed at various locations along the tubing. As an example, three or more surface openings may be positioned along the length of the tubing at various distances from the apex of the balloon. Over these surface openings may be placed the restraining tape as discussed below. As an example, the surface openings may be position such approximately every 3 meters or so to keep the film from sliding down the tendon and bunching. In this regard, the restraining tape may be placed approximately every three meters.

Figure 7A:
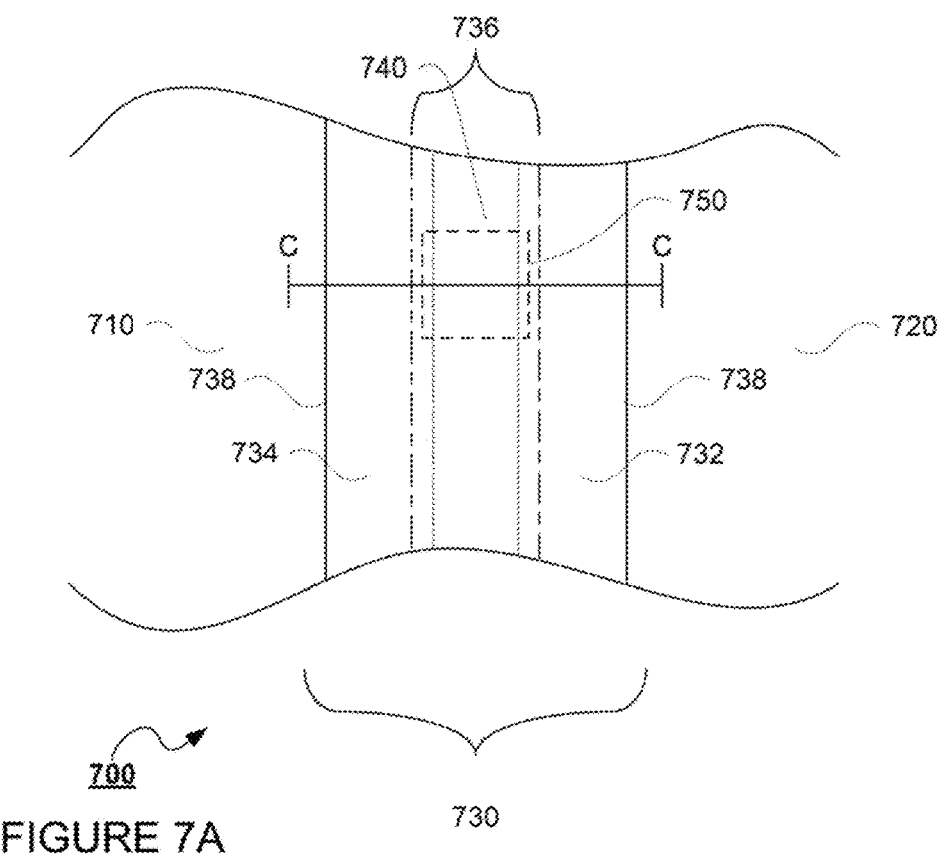
FIGS. 7A and 7B are additional example diagrams of one or more gores of a balloon including a portion of tubing in accordance with aspects of the disclosure.
Figure 7B:
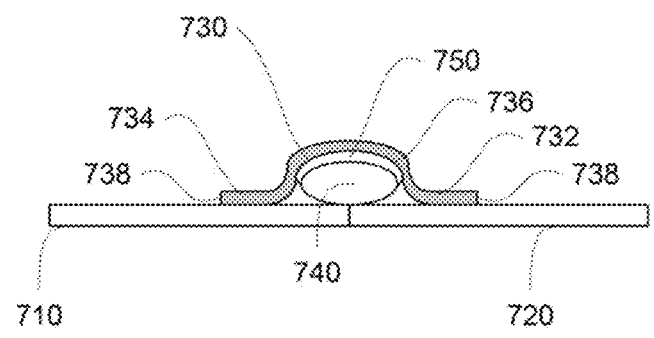

In addition or as an alternative to the surface openings, to further secure the tendon, double-sided restraining tape may be placed between the tendon and the tubing. FIGS. 7A and 7B are views of a portion 700 of tubing between two gores. FIG. 7B is a cross sectional view through plane C-C of FIG. 7A. As with portion 500 and 600, portion 700 includes envelope gore portions 710 and 720, a section of tubing 730 (shown as shaded in FIG. 7B), and a tendon 740. Again, envelope gore portions 710 and 720 may be part of the same or a different gore. Tubing 730 also includes three regions: outer regions 732 and 734 (corresponding to outer regions 532 and 534) having outer edges 738 and an opening region 737. The outer regions 732 and 734 may again include lower surfaces having adhesive strips that hold the tubing to the envelope gores 710 and 720. In this example, a double-sided restraining tape 750 is placed between the tendon 740 and the tubing 740 in order to keep the tendon 740 in place longitudinally (as well as laterally) relative to the tubing 730 and/or envelope gore portions 710 and 720. Again, the restraining tape may be a PSA tape.

The restraining tape may be placed at various locations along the tubing. As an example, three or more pieces of restraining tape may be positioned along the length of the tubing at various distances from the apex of the balloon. As an example, the double sided restraining tape may be position approximately every 3 meters or so to keep the film from sliding down the tendon and bunching.

Figure 8A:
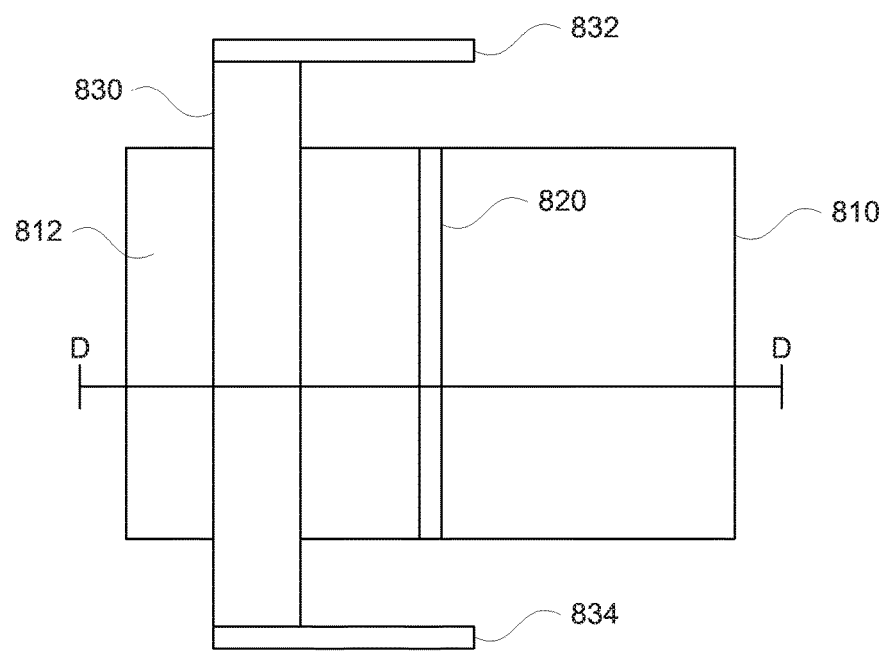
FIGS. 8A, 8B, and 8C are example diagrams of manufacturing configurations in accordance with aspects of the disclosure.
Figure 8B:
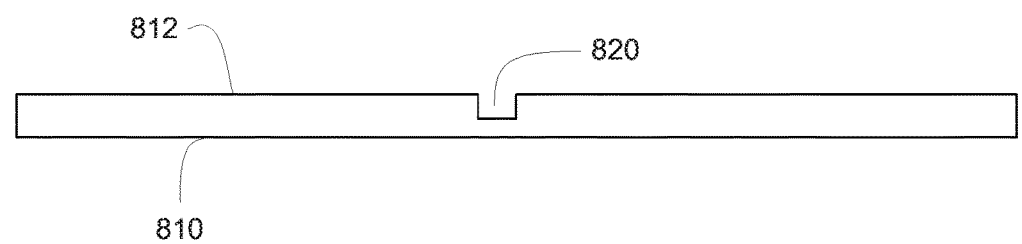

FIGS. 8A and 8B are example views of a machinery configuration for placing and securing tendons within tubing. FIG. 8A is a top down view while FIG. 8B is a cross sectional view of table through plane D-D of FIG. 8A. In this example, a table 810 has a top surface 812 including a groove 820. Groove 820 may be configured to receive a tendon and an envelope gore such that the outer surface of the tendon is flush, or approximately flush, with the top surface 812 of the table. Groove 820 may also be configured to hold multiple envelope gore and tendon layers, for example, two of each in order to manufacture multiple balloon envelope gore portions at once. Above table 810 is an overhead gantry structure 830 configured to lay a tendon within the groove 820. Arms 832 and 834 are configured to hold tendon and apply a slight pressure to the tendon. In addition, arms 832 and 834 may be used to lay tape or other adhesive to the tendon and/or tubing. In this regard, the gantry structure may be used for various purposes. Although not shown, the table may also include structures, such as clamps, to apply a tensioning force to the tendons.

Figure 8C:
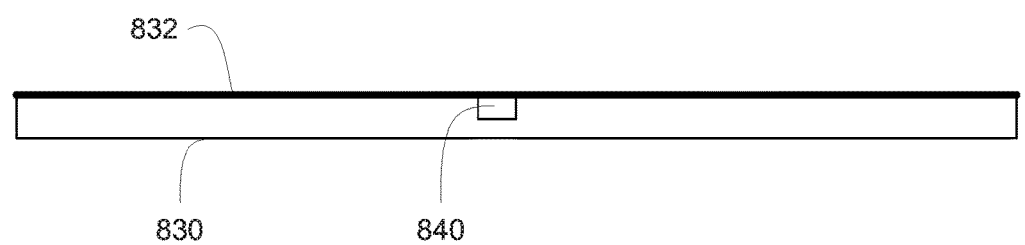

FIG. 8C is a further example of a machinery configuration for placing and securing tendons within tubing. In this example, a table 830 has a top surface 832 including a groove 840. In this example, groove 840 is covered with a thin layer of material such as latex, lycra, or nylon which may flex into the groove when the tendon is laid in the groove. Groove 840 may be configured to receive a tendon and an envelope gore such that the outer surface of the tendon is flush, or approximately flush, with the top surface 832 of the table. Groove 840 may also be configured to hold multiple envelope gore and tendon layers, for example, two of each in order to manufacture multiple balloon envelope gore portions at once. Above table 830 may also be an overhead gantry structure configured to lay and apply tension to a tendon within the groove 840 and also to lay tape or other adhesive to the tendon and/or tubing.

Example Methods

Figure 9:
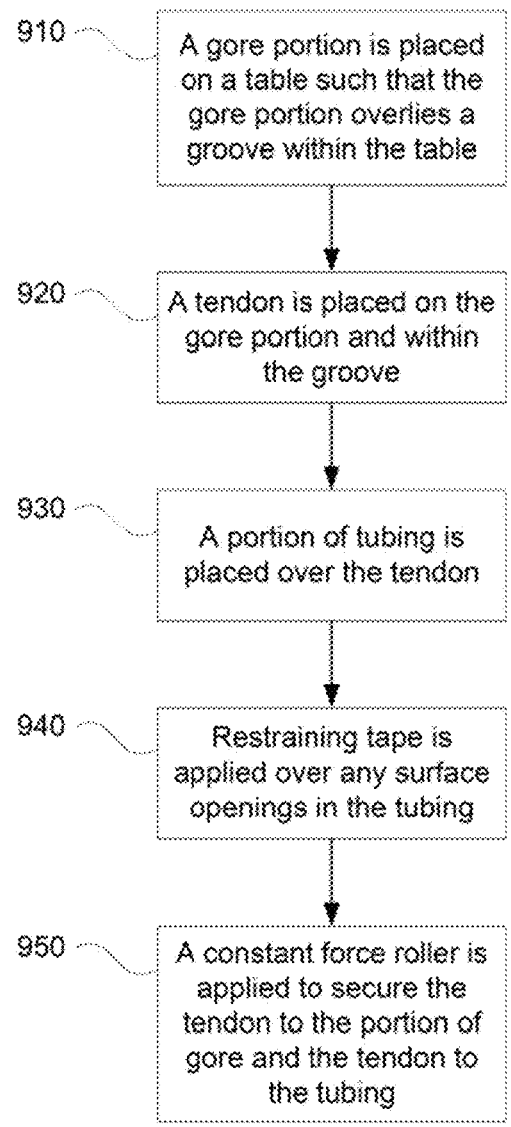
FIG. 9 is a flow diagram in accordance with aspects of the disclosure.

FIG. 9 is an example flow diagram 900 for manufacturing balloon envelopes with tubing having the surface openings, such as tubing 630 described above. In this example, an envelope gore portion is placed on a table or other work surface having a groove at block 910. As an example, one or more of gore portions 610 and 620 may be placed on a table such as table 810. The gore portion may be placed such that it overlies at least a portion of the groove.

Next, a tendon is placed on the gore portion within the groove of the table at block 910. By way of example only, this tendon may be placed using the gantry 830 of FIG. 8A. If the gantry is used, the gantry arms 832 and 834 may be used to hold some tension on the tendon. Alternatively, the table may include features, such as clamps, to provide such tension. Again, the groove 820 may be configured such that when a tendon, such as tendon 640, is placed within the groove (and over the portion of gore), a top surface of the tendon 630 is flush, or approximately flush, with the top surface 812 of table 810.

At block 930, a portion of the tubing is placed over the tendon. As an example, portion of tubing 630 may be placed over the tendon 640. The adhesive strips of tubing 630 are configured to secure the tendon 640 to the portion of gore. In this example, the adhesive strips may be positioned to the lateral side of the tendon such that the tendon 640 may be visible through any surface openings 650 in the tubing 630. Pieces of restraining tape, such as restraining tape 660, are then placed over any surface openings at block 940.

Once the restraining tape, tubing, tendon, and portions of gore are in place, a constant force roller may be applied at block 950. As an example, the constant force roller may be a tool which allows a person or machine to apply a force to any items on the table, such as a rolling pin or wheel. Because the tendon is flush, or approximately flush with the top surface of the table, the constant force roller is configured to secure the adhesive strips of the tubing 630 to the portion of the gore, and the restraining tape 660 may secure the tendon 640 to the tubing 630. This configuration helps prevent any undesired lateral and longitudinal movement of the tendon relative to the tubing and/or the portion of gore during inflation of the balloon envelope.

In addition, before applying the constant force roller, the features of blocks 910 through 940 may be repeated multiple times. In this regard, several tendons may be secured to different portions of gore at the same time. In this example, the groove 820 of table 810 may thus be configured such that only the topmost tendon lies flush, or approximately flush, with the top surface 812 of the table 810.

Figure 10:
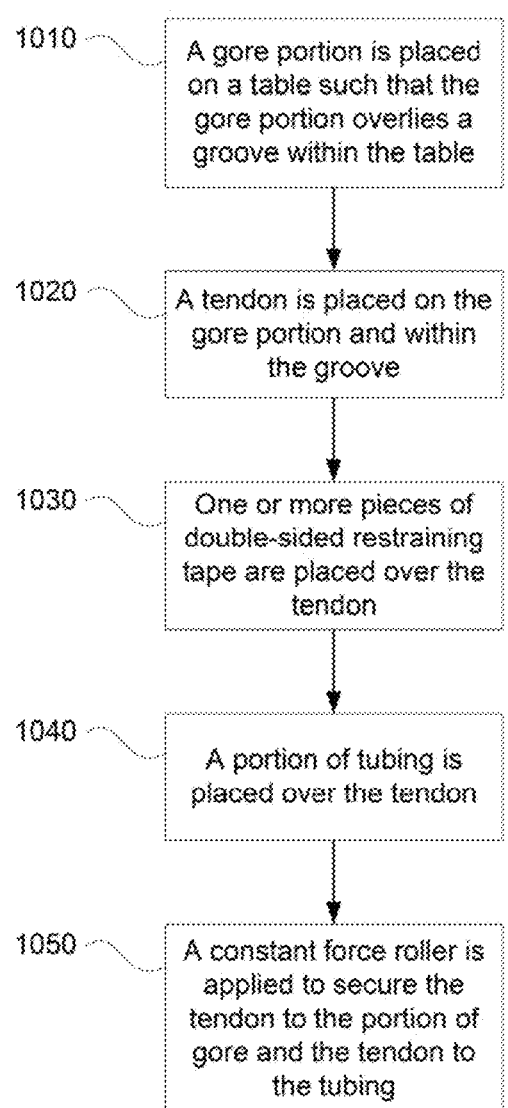
FIG. 10 is another flow diagram in accordance with aspects of the disclosure.

FIG. 10 is an example flow diagram 1000 for manufacturing balloon envelopes with tubing using double-sided restraining tape. In this example, an envelope gore portion is placed on a table or other work surface having a groove at block 1010. As an example, one or more of gore portions 710 and 720 may be placed on a table such as table 810. The gore portion may be placed such that it overlies at least a portion of the groove.

Next, a tendon is placed on the gore portion within the groove of the table at block 1020. This tendon may be placed using the gantry 830 of FIG. 8A. If the gantry is used, the gantry arms 832 and 834 map also be used to hold some tension on the tendon. Alternatively, the table may include features, such as clamps, to provide such tension. Again, the groove 820 may be configured such that when a tendon, such as tendon 740, is placed within the groove (and over the portion of gore), a top surface of the tendon 740 is flush, or approximately flush, with the top surface 812 of table 810.

At block 1030, one or more pieces of double-sided restraining tape is placed onto the tendon. Tubing is then placed over the double-sided restraining tape and the tendon at block 1040. As an example, portion of tubing 730 may be placed over the tendon 740. The adhesive strips of tubing 730 may secure the tendon 740 to the portion of gore. In this example, the adhesive strips may be positioned to the lateral side of the tendon such that the tendon 740 may be visible through any surface openings 750 in the tubing 730.

Once the double-sided restraining tape, tubing, tendon, and portions of gore are in place, a constant force roller may be applied at block 1050. As an example, the constant force roller may be a tool which allows a person or machine to apply a force to any items on the table, such as a rolling pin or wheel. Because the tendon is flush, or approximately flush with the top surface of the table, the constant force roller may secure the adhesive strips of the tubing 730 to the portion of the gore, and the double-sided restraining tape 770 may secure the tendon 740 to the tubing 730. This configuration may prevent the tendon from any undesired lateral and longitudinal movement relative to the tubing and/or the portion of gore during inflation of the balloon envelope.

In addition, before applying the constant force roller, the features of blocks 1010 through 1040 may be repeated multiple times. In this regard, several tendons may be secured to different portions of gore at the same time. In this example, the groove 820 of table 810 may thus be configured such that only the topmost tendon lies flush, or approximately flush, with the top surface 812 of the table 810.

Figure 11A:
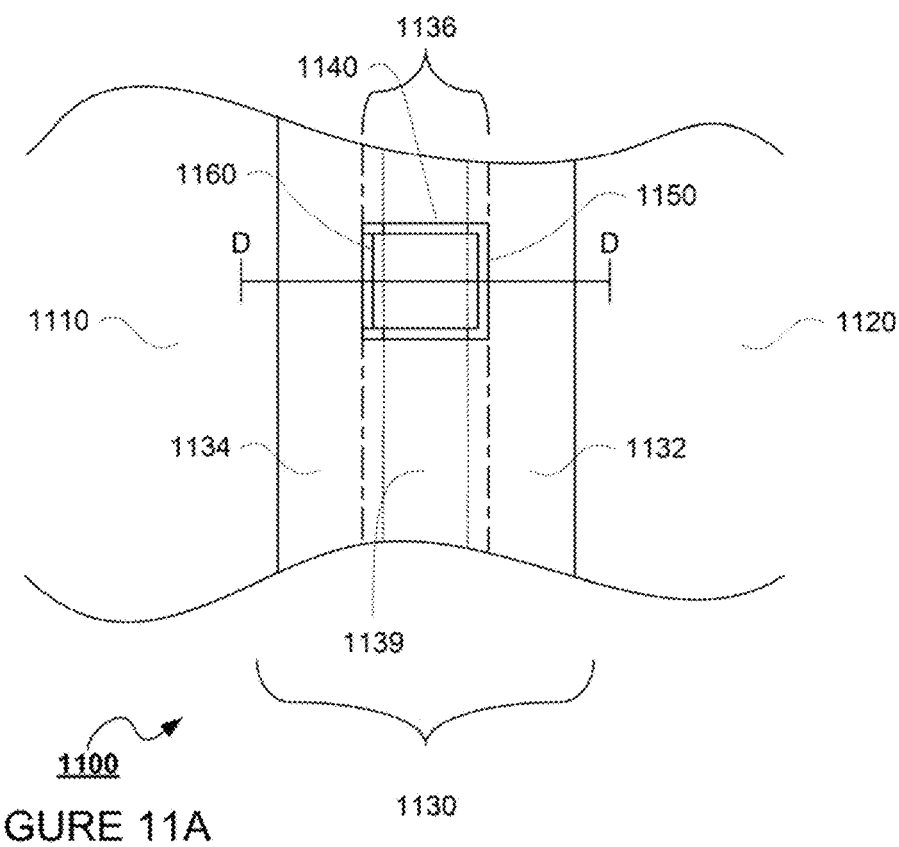
FIGS. 11A and 11B are additional example diagrams of one or more gores of a balloon including a portion of tubing in accordance with aspects of the disclosure.
Figure 11B:
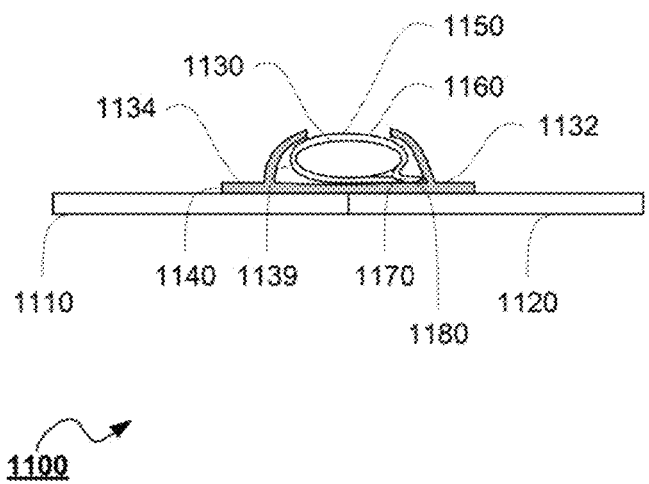

While the aspects described above include a tendon which is placed directly onto an envelope gore, in other examples, the tubing may extend between the tendon and the envelope. FIGS. 11A and 11B are views of a portion 1100 of tubing between two gores. FIG. 11B is a cross sectional view through plane D-D of FIG. 11A. As with portion 500, 600, and 700, portion 1100 includes envelope gore portions 1110 and 1120, a section of tubing 1130 (shown as shaded in FIG. 11B), and a tendon 1140. Again, envelope gore portions 1110 and 1120 may be part of the same or a different gore.

Tubing 1130 includes four regions: outer regions 1132 and 1134, base region 1136, top region 1138, and an opening region 1139. The base region 1136 may be configured to attach to the envelope gores 1110 and 1120 using the adhesive strips as described above, for example, with regard to the outer regions 732 or 532 and 734 and 534. Alternatively, rather than having any adhesive between the tubing and the envelope gore, the tubing may be secured to the envelope gores 1110 and 1120 using a heat sealing process. For example, as described above, the material of the tubing may be configured as a piece of polyethylene or other thin film which may be heated and sealed to the envelope gore in a manual or automated heat sealing process.

In this example, in order to secure the tendon within the tubing longitudinally, the tendon may be tacked to the inside of the tubing. In order to do so, the tubing may include a plurality of openings 1150 cut into the top region 1138 of the tubing. The openings need only be large enough to place a piece of restraining tape 1160 within the tubing 1140 and around the tendon 1130. In this regard, the tendon may be placed within the tubing before the restraining tape 1160 is applied, though the openings may be cut before or after the tendon is placed within the tubing.

As with the examples of FIGS. 5, 6 and 7, the openings and restraining tape may be placed at various locations along the tubing. As an example, five or more openings and pieces of restraining tape may be positioned along the length of the tubing or at various distances, such as every 3 meters or 3 meters from the apex of the balloon. The number of openings, such as opening 1150, and restraining tape, such as restraining tape 1160, used in this example may be selected based upon the expected stresses applied to the balloon envelope during inflation and launch. As an example, given a tendon that is 4 mm in diameter with a 2 mm clearance around the tending within the tubing, using the restraining tape to secure the tendon within the tubing may also reduce movement of the tendon within the tubing given the amount of friction between the tendon and the tubing. In this regard, the restraining tape used to secure the tendon to the tubing may be designed to fail before the connection of the tubing to the envelope gore would fail.

As with the examples above, tubing 1130 may be secured to the gores 1110 and 1120 using a table having a groove, such as table 810 with groove 820 of FIGS. 8A and 8B or table 830 with groove 840. Here, groove 820 or 840 may be configured to receive a tendon, tubing, and an envelope gore such that the top region 1138 of the tubing is flush, or approximately flush, with the top surface 812 or 832 of the table. Groove 820 or 830 may also be configured to hold multiple envelope gore, tubing and tendon layers, for example, two of each in order to manufacture multiple balloon envelope gore portions at once. Again, an overhead gantry structure may be configured to lay and apply tension to a tendon within the groove 840.

Figure 12:
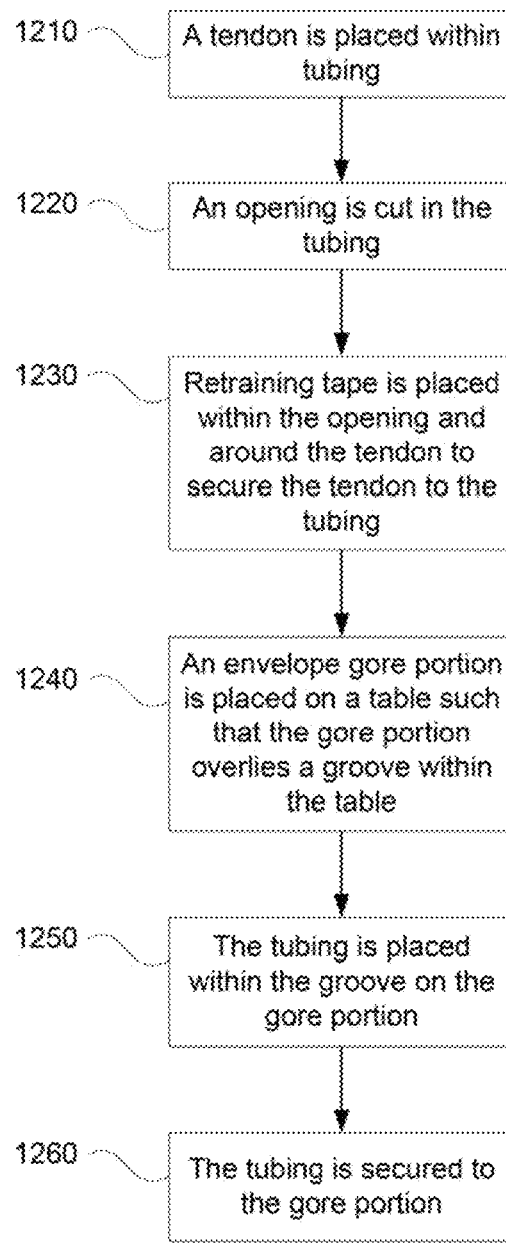
FIG. 12 is a further flow diagram in accordance with aspects of the disclosure.

FIG. 12 is an example flow diagram 1200 for manufacturing balloon envelopes with tubing in which restraining tape is used to secure a tendon to the tubing. In this example, a tendon is placed within tubing at block 1210. For example, the tubing 1130 may include an opening region 1139 in which the tendon 1140 may be placed.

At block 1220, an opening is cut into the tubing. As an example, the opening may be cut using scissors, a razor blade, or other cutting device. Restraining tape is then placed around the tendon in order to secure the tendon to the tubing at block 1230. As an example, restraining tape 1160 may be taped around the tendon 1130 and back onto the restraining tape, where at least one adhesive edge, such as edge 1170, of the restraining tape contacts an interior surface 1180 of the tubing.

An envelope gore portion is placed on a table or other work surface having a groove at block 1240. As an example, one or more of gore portions 1110 and 1120 may be placed on a table such as table 810. The gore portion may be placed such that it overlies at least a portion of the groove.

Next, the tubing is placed within the groove and on the gore portion at block 1250. This tubing and tendon may be placed using the gantry 830 of FIG. 8A. If the gantry is used, the gantry arms 832 and 834 are used to hold some tension on the tendon. Alternatively, the table may include features, such as clamps, to provide such tension. Again, the groove 820 may be configured such that when tubing with a tendon, such as tubing 1130 with tendon 1140, is placed within the groove (and over the portion of gore), a top region 1138 of the tubing 1130 is flush, or approximately flush, with the top surface 812 of table 810.

The tubing may be secured to the gore portion at block 1260. As an example, the tubing may be secured to the gore portion using adhesive strips. In this example, the adhesive strips may be applied or made ready before the tubing is placed within the groove. A constant force roller, such as that described above, may also be used to the constant force roller may be used to apply pressure to the subbing and the adhesive strip in order to secure the adhesive strips of the tubing 1130 to the gore portion. Alternatively, rather than using adhesive strips, the tubing may be heat sealed to the gore portion, for example by melting and fusing the material of the tubing to the gore portion using a heat source. This configuration may prevent the tendon from any undesired lateral and longitudinal movement relative to the tubing and/or the portion of gore during inflation of the balloon envelope.

Once the tendon and tubing are secured using any of the techniques described above, along or in combination, the portion of gore may be removed from the table. As discussed above, multiple portions of gore may be heat sealed to one another to form a completed balloon envelope. The balloon envelope may then be inflated. During inflation, the tubing and restraining tape may hold the tendon in place to prevent undesired lateral and/or longitudinal movement.

Regarding any of the examples above, an additional adhesive patch may also be applied at the ends of the tubing. This additional patch may provide resistance when the restraining tape is applied as described above. This patch may appear different depending on whether the tubing is complete (as in the examples of FIGS. 11A and 11B) or if the tubing is only an over covering (as in the examples of FIGS. 5A-7B). For example, for a complete tubing, the additional patch should extend from inside the tube to the envelope. For an over covering tubing, a wing patch over the tubing may be used. Alternately, if the tubing is trimmed some short distance, the excess tubing material may as the additional patch and an additional adhesive patch may not be required.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of manufacturing a balloon envelope, the method comprising:
   placing a gore portion on a table such that the gore portion overlies a groove within the table;
   placing a tendon on the gore portion and within the groove;
   placing a portion of tubing over the tendon, the tubing having one or more surface openings;
   applying restraining tape over the one or more surface openings in the tubing; and
   applying a constant force roller to secure the tendon to the gore portion and to secure the tendon to the tubing.

2. The method of claim 1, wherein the restraining tape is placed in order to provide stability during inflation of the balloon envelope.

3. The method of claim 1, wherein the restraining tape is a pressure sensitive adhesive tape.

4. The method of claim 1, wherein the tubing includes a polyethylene thin film having a first edge along which an adhesive is positioned, and the adhesive is configured to secure the tubing to the gore portion when the constant force roller is applied.

5. The method of claim 1, further comprising, prior to applying the constant force roller:
   placing a second gore portion on the table such that the gore portion overlies the tendon within the groove;
   placing a second tendon on the second gore portion and within the groove;
   placing a second portion of tubing over the second tendon, the second tubing having one or more second surface openings; and
   applying second restraining tape over the one or more second surface openings in the second tubing.

6. The method of claim 5, wherein applying the constant force roller further secures the second tendon to the second gore portion and secures the second tendon to the second tubing.

7. The method of claim 1, further comprising, before placing the portion of tubing, applying double-sided restraining tape at one or more locations on the tendon and wherein applying the constant force roller further secures the double-sided restraining tape to the tendon and the tubing.

8. A method of manufacturing a balloon envelope, the method comprising:
   placing a gore portion on a table such that the gore portion overlies a groove within the table;
   placing a tendon on the gore portion and within the groove;
   applying double-sided restraining tape at one or more locations on the tendon;
   placing a portion of tubing over the tendon and the double-sided restraining tape; and
   applying a constant force roller to secure the tendon to the gore portion and to secure the tendon to the tubing.

9. The method of claim 8, wherein the restraining tape is placed in order to provide stability during inflation of the balloon envelope.

10. The method of claim 8, wherein the double-sided restraining tape is a pressure sensitive adhesive tape.

11. The method of claim 8, wherein the tubing includes a polyethylene thin film having a first edge along which an adhesive is positioned, and the adhesive is configured to secure the tubing to the gore portion when the constant force roller is applied.

12. The method of claim 8, further comprising, prior to applying the constant force roller:
   placing a second gore portion on the table such that the gore portion overlies the tendon within the groove;
   placing a second tendon on the second gore portion and within the groove;

applying second double-sided restraining tape at one or more locations on the tendon; and placing a second portion of tubing over the second tendon, the second tubing having one or more second surface openings.

13. The method of claim 12, wherein applying the constant force roller further secures the second tendon to the second gore portion and secures the second tendon to the second tubing.

14. A method of manufacturing a balloon envelope, the method comprising:
    placing a tendon within tubing;
    cutting an opening in the tubing;
    placing restraining tape within the opening and around the tendon to secure the tendon to the tubing;
    placing a balloon envelope gore portion on a table such that the gore portion overlies a groove within the table;
    placing the tubing within the groove and on the gore portion; and
    securing the tubing to the gore portion.

15. The method of claim 14, wherein the restraining tape is placed in order to provide stability during inflation of the balloon envelope.

16. The method of claim 14, wherein the restraining tape is a pressure sensitive adhesive tape.

17. The method of claim 14, wherein the tubing includes an adhesive strip and securing the tubing to the gore portion includes placing the adhesive strip on the gore portion and applying pressure to the tubing.

18. The method of claim 14, wherein securing the tubing to the gore portion includes heat sealing the tubing to the gore portion.

19. The method of claim 14, further comprising:
    cutting a second opening in the tubing; and
    placing second restraining tape within the second opening and around the tending to secure the tendon to the tubing in order to further secure the tendon within the tubing.

20. The method of claim 14, further comprising applying a tension force to the tendon during placement of the tendon.

* * * * *